United States Patent [19]

Abe

[11] 3,925,567

[45] Dec. 9, 1975

[54] PROCESS FOR PREPARING SNACK-FOODS FROM STARCH

[76] Inventor: Shunji Abe, 1-Banchi Oaza Tsuchikawa, Ojiya, Niigata, Japan

[22] Filed: Mar. 26, 1974

[21] Appl. No.: 454,909

[52] U.S. Cl. .............................. 426/559; 426/808
[51] Int. Cl.² ........................................ A21D 10/00
[58] Field of Search ........... 426/343, 142, 145, 808, 426/549, 550, 559

[56] References Cited
UNITED STATES PATENTS

| | | |
|---|---|---|
| 3,615,658 | 10/1971 | Glabe .............................. 426/343 X |
| 3,719,501 | 3/1973 | Rispoli ............................ 426/808 X |
| 3,800,050 | 3/1974 | Popel et al. ........................ 426/343 |

*Primary Examiner*—Raymond N. Jones
*Attorney, Agent, or Firm*—Finnegan, Henderson, Farabow & Garrett

[57] ABSTRACT

The present invention relates to a process for preparing snack-foods from glutinous type starch, which is characterized in that a cake material prepared by kneading with steam glutinous type starch containing 20 % or more of rice flour and/or other cereal flour, is immediately cooled and solidified, then cut to a desired shape, dried and baked into the desired snack-foods with improved quality.

2 Claims, No Drawings

PROCESS FOR PREPARING SNACK-FOODS FROM STARCH

The present invention relates to a process for preparing snack-foods from glutinous type starch. Particularly, it relates to a process for preparing snack-foods of improved quality from glutinous type starch containing 20 % or more of rice flour and/or other cereal flour. More particularly, the process of the present invention is characterized in that a cake material prepared by kneading with steam glutinous type starch containing 20 % or more of rice flour and/or other cereal flour is immediately cooled and solidified, then cut to a desired shape, dried and baked into the desired snack-foods with improved quality.

Up to date, many attempts have been made to prepare snack-foods from glutinous type starch such as waxy corn starch, glutinous millet starch, glutinous kaoliang starch and the like. However, in spite of many improvements in the steps and operations in the prior arts, nobody could succeed in producing snack-foods of the same soft texture as those obtained from glutinous rice, because the products obtained had rough texture because of hardness and insolubility in the mouth.

In a conventional method of preparing snack-foods, when a raw material is kneaded with steam, thereby producing a cake material, it is inevitable that the water content of the cake material rises by introducing steam into a steam kneader and that the physical properties of the cake material are deteriorated with the progress of α-starch formation. Particularly, in case of using starch as the raw material, the starch absorbs water boundlessly in portion to the time for kneading with steam, because it has no cell membranes which inhibit it from swelling. Therefore, when starch is kneaded with steam, α-starch formation proceeds too much, thereby lowering the viscosity of the cake material produced. Further, the cake material is too soft to be cut into a desired shape and difficult to be solidified by cooling. Furthermore, as the cake material is easy to break in a drying step, it has been difficult to obtain commercially available snack-foods therefrom.

The inventor of the present invention has tried to prepare snack-foods of improved quality from glutinous type starch and found that if glutinous type starch would be mixed with 20 % or more of rice flour and/or other cereal flour, the water content of the mixture does not change so much during kneading with steam, thereby producing a fine and homogeneous cake material. That is, rice or other cereal flour which is difficult to swell on account of having cell membranes, enters into starch perticles, the resulting mixture is disturbed to swell in the step of kneading with steam and there can be obtained a physically stable cake material. The process of the present invention is based on the above finding.

Accordingly, the object of the present invention is to provide a process for preparing snack-foods of good taste and soft texture which could not be produced from glutinous type starch by any prior arts, wherein glutinous type starch containing 20 % or more of rice flour and/or other cereal flour is used as the raw material.

In accordance with the process of the present invention, snack-foods of improved quality can be obtained by kneading with steam a raw starch material containing 20 % or more of rice flour and/or other cereal flour, thereby preparing a cake material, immediately cooling and solidifying the cake material, cutting the solidified material to any shapes of the desired products, drying the shaped material and baking the dried material.

The process of the present invention will be clarified more in detail hereinafter.

As the raw starch material of the invention can be used glutinous type starch mixed with 20 % or more of rice flour and/or other cereal flour. As the glutinous type starch, there are exemplified glutinous rice starch, waxy corn starch, glutinous millet starch, glutinous kaoliang starch and the like. The glutinous type starch mentioned above or a mixture thereof may be used by mixing with rice flour such as glutinous rice flour or non-glutinous rice flour, and/or other cereal flour such as corn flour, rice bran, corn grits, corn meal and the like. The mixing ratios of rice flour and/or other cereal flour to the raw starch material is selected to be 20 % or more in accordance with desired products.

The above glutinous type starch material containing 20 % or more of rice flour and/or other cereal flour is kneaded with steam, with addition of water, for about 8 – 10 minutes to give a homogeneous cake material. After kneading, if necessary, steam may be discharged from a steam kneader so as to remove a bad smell of the starch material and obtain snack-foods of good taste. As similar to a conventional preparation of snack-foods from rice such as crackers, pellets, Kakinotane (product shaped like persimmon seed) and the like, it is also desired in the present invention to prepare a fine and homogeneous cake material by satisfactorily kneading with steam. Since unhomogeneous cake material is easy to break in a drying step and undergoes bad effects on the swelling in a baking step, sufficiently swelled products can not be obtained from unhomogeneous cake material. Therefore, the step of kneading with steam has to be carried out carefully in order to produce a fine and homogeneous cake material.

In the next place, the homogeneous cake material prepared above is immediately transferred to a cooling step. In the cooling step, it is essentials to cool the cake material itself to a lower temperature as quickly as possible after preparation thereof. That is, the cake material is preferably cooled to about 5°C within at least 6 hours after preparation thereof. The cooling is then further continued to give a solidified material of a satisfactory hardness for the next cutting step. The more quickly the cake material is cooled, the more favorable the taste and texture of snack-foods become. However, it should be avoided freezing the cake material because it has bad influences on the quality of the product. The cooling has to be carried out under the above condition, otherwise there can not be obtained a satisfactorily swelled product with soft texture.

More concretely, the rapid cooling and solidifying of the cake material is effectively carried out in such a way that the cake material is extruded into a sheet of 1.0 – 1.5 cm in thickness by a kneading and extruding machine and the sheet material is taken out on a plate spread with a flour, then immediately put into a cooling apparatus, for example, a refrigerator at 1° – 5°C and allowed to stand for 12 – 18 hours therein. When the thickness of the material is more than 1.5 cm, a special high power refrigerator should be used. In this way, by means of the rapid cooling and solidifying of the cake material prepared from the raw starch material containing 20 % or more of rice flour and/or other cereal flour, can be obtained a satisfactorily swelled snack-foods of good taste and soft texture. Moreover, even if the temperature of the cake material itself falls to less than 5°C by the rapid cooling, the cake material does not become so hard to be cut. Therefore, the cake material is necessary to be further cooled and solidified by allowing to stand in a refrigerator for a certain hour as described above.

Thus, the cooled and solidified material is cut to a desired shape of 1.0 – 2.5 mm in thickness and then dried. When the thickness is more than 2.5 mm, the shaped material is difficult to be efficiently dried and the swelling of the material is disturbed in the baking step. The temperature of the solidified material is desired to be lower for cutting thereof. The cutting is preferably carried out at a room temperature of 2° – 15°C within 2 hours. Subsequently, the cut and shaped material is effectively dried with ventilation at a lower temperature, for example, by a ventilating drier at 25° – 80°C, preferably 25° – 50°C, within 6 hours. The drying of the shaped material should be performed as rapidly as possible for preventing the retrogradation of the material. A conventional drier for non-glutinous rice crackers at 60° – 80°C may be also used in the drying step, thereby giving a product of improved quality. However, compared with the drying by a ventilating drier at a lower temperature, the shaped material is unhomogeneously dried and the quality of the product is apt to deteriorate.

After drying, the dried material is allowed to stand for 8 – 24 hours (aging) for the purpose of adjusting water content thereof to definite level and obtaining homogeneously baked products. The aging is carried out at 10° – 35°C, preferably at 5° – 15°c, because a higher temperature accelates the retrogradation of the material. In the next baking step, the material is preferably baked little by little at a time so as to produce a favorably swelled product of improved quality. Further, in the seasoning step after baking, the baked material is spread with a desired liquid relish when the temperature of the material is about 30° – 50°C, since the seasoning at a lower or higher temperature except 35° – 50°C can not give the satisfactorily glazed product.

As described above, snack-foods of improved quality having soft texture and good tast such as crackers, pellets, Kakinotane and the like can be obtained from the raw starch material containing 20 % or more of rice flour and/or other cereal flour according to the process of the present invention.

As machines available for the process of the present invention, there may be exemplified as follows; a rice pearling equipment, a continuously automatic rice washer, an automatic cake making machine, a steam kneader, a kneading machine for a strip shaped cake material, a kneading and extruding machine, a grain-type automatic cake making machine, a prefabricated refrigerator, a cutting machine for a pellet material, a turning-type cutting machine for a pellet material, a one-step ventilating drier, a three-steps ventilating drier, a jumbosize automatic reciprocating moving oven, a moving gas oven, a water jacket-type shaking machine, a rotating drum-type glazing machine, an automatic seasoning machine, a moving drier for finishing, a seazoning machine and so on.

The present invention provides a process for preparing snack-foods of improved quality such as crackers, pellets, Kakinotane and the like, by using glutinous type starch containing 20 % or more of rice flour and/or other cereal flour as the raw material, as well as making some improvements in the prior processes. That is, the snack-foods obtained by the process of the present invention are efficiently puffed and spongy and also have good texture similar to those obtained from glutinous rice. They have, further, favorable taste of the starch used as the raw material. When the process of the present invention is is carried out, the conventional equipments for preparing snack-foods from glutinous rice can be available for all steps thereof. Accordingly, the desired snack-foods of the present invention can be easily prepared in any factory for producing snack-foods from glutinous rice. Although new steps for cooling and shaping are added in the process of the present invention, the time required for all steps can be sharply shortened because of shortening the time for drying and simplifying operation, as compared with the prior processes. It follows that the yield of the products can be increased.

It can not be clearly understood the reason why snack-foods such as crackers, pellets, Kakinotane and the like have the qualities similar to the snack-foods derived from glutinous rice. However, it is deemed that the followings are the main reasons:

1. The raw materials respectively comprises 100 % of amylopectin which has similar properties to those of glutinous rice starch.

2. Starch swelling is prevented by mixing 20 % or more of rice flour and/or other cereal flour having cell membranes therein with the above starch having no cell membranes, thus obtaining homogeneous cake material by disturbing the swelling property.

3. According to the prior processes, prepared cake material is immediately dried at a comparatively higher temperature for preventing the material from retrogradation, thereby obtaining snack-foods. In contrast, the present invention intends to obtain snack-foods from a less retrograded cake material by quickly cooling. Such a quickly cooling effect on the cake material is also considered as one of the reasons why the snack-foods produced according to the present invention are efficiently puffed and has soft texture similar to those made of glutinous rice.

The embodyments of the invention will be clarified more in detail by the following examples.

EXAMPLE 1

A mixture of 40 kg of commercially available waxy corn starch and 40 kg of glutinous rice flour of 80 – 100 mesh in average particle size prepared by milling scraps of glutinous rice after polishing, washing with water and dripping, was put into a steam kneader. After adding 40 kg of water thereto, the mixture was kneaded with steam under the initial pressure of 2.0 kg/cm$^2$ and the steam pressure of 0.5 kg/cm$^2$ for 8 minutes to prepare a cake material. At the end of kneading the cover of the steam kneader was taken off and steam was discharged so as to remove a bad smell. The cake material was supplied to Kakinotane making machine and extruded into a stick whose section was shaped like persimmon seed. The stick material was taken out on a plate spread with a flour, then immediately put into a refrigerator at 2° – 5°C and left for 18 hours therein to be cooled and solidified. The solidified material was cut into pieces like persimmon seeds of 1.3 mm in thickness, then dried in a ventilating drier according to the conventional method until the water content was reduced to 22 – 23 %. Subsequently, the dried material was allowed to stand for 1 day at a room temperature in an air-tight container (aging). After aging the material was baked at 280°C by 5 kg at a time in a baking oven. Thus baked material having no relishes was applied with soy glazing liquid by a rotating drum-type glazing machine and dried to obtain a snack-food like Kakinotane of improved quality. The product has soft texture as similar to those made of glutinous rice.

EXAMPLE 2

Eighty kilograms of a mixture of commercially available waxy corn starch and non-glutinous rice flour (mixing ratio 7 : 3) was put into a steam kneader. After adding 50 kg of water thereto, the mixture was kneaded with steam under the steam pressure of 0.5 kg/cm$^2$ for 9 minutes to prepare a cake material. At the end of kneading the cover of the steam kneader was taken off and steam was discharged so as to remove a bad smell. Thus prepared cake material was further passed though a kneader in order to make a homogeneous cake material. The homogeneous cake material was extruded into a sheet of 1.0 cm in thickness by a kneading and extruding machine and taken out on a plate spread with a flour. The sheet material was at once put into a refrigerator at 2° – 5°C and left for 14 hours so as to be cooled and solidified. The solidified material was cut into pieces (10mm × 45mm × 1.2mm) and dried in a ventilating drier at 30° – 35°C until the water content was reduced to about 20 %. The dried material was allowed to stand overnight at a room temperature in an air-tight container, then baked at 280°C by 1.0 kg at a time in a baking oven. Thus baked material was spread with salad oil in the amount of 10 % based on the material by a rotating drum-type glazing machine and seasoned with salt, thereby obtaining a fried snack-food of improved quality.

EXAMPLE 3

A mixture of 50 kg of glutinous millet starch prepared from commercially available glutinous millet by alkaline process, 25 kg of commercially available rice bran and 5 kg of corn flour was put into a steam kneader. After addition of 50 kg of water, the mixture was kneaded with steam under the steam pressure of 0.5 kg/cm$^2$ for 7.5 minutes. Thereafter the cover of the steam kneader was immediately taken off and steam was discharged so as to remove a bad smell. In this way, the produced cake material was further passed through a kneader, thereby making a homogeneous cake material. The homogeneous cake material was extruded into a stick of diameter of 2.5 cm by Kakinotane making machine. The stick material was taken out on a plate spread with a flour, then at once put into a refrigerator at 5°C and left for 18 hours therein so as to cooled and solidified. The solidified material was cut into pieces like persimmon seeds of 1.7 mm in thickness and dried in a ventilating drier at 30° – 35°C for 3.5 hours until the water content was reduced to about 30 %. Subsequently, the dried material was allowed to stand for 20 hours at a room temperature in an air-tight container, then baked by 8 kg at a time in an automatic baking oven. The baked material was glazed and seasoned to obtain a snack-food like Kakinotane of improved quality.

EXAMPLE 4

A mixture of 50 kg of commercially available waxy corn starch, 25 kg of rice bran and 5 kg of corn flour was put into a steam kneader. After adding 45 kg of water, the mixture was kneaded with steam under the steam pressure of 0.5 kg/cm$^2$ for 8.5 minutes, thereby producing a homogeneous cake material. The cake material was treated in the same manner as described in Example 3 to obtain a snack-food like Kakinotane of improved quality.

As mentioned above, there can be obtained snack-foods with good taste and soft texture similar to those made of glutinous rice, from glutinous type starch containing 20 % or more of rice flour and/or other cereal flour according to the process of the present invention.

What is claimed is:

1. A process for preparing puffed snack food products from glutinous type starch which comprises mixing by kneading with steam for a period of time sufficient to produce a homogeneous cake material a glutinous type starch selected from the group consisting of glutinous rice starch, waxy corn starch, glutinous millet starch and glutinous kaoliang starch with at least 20% based on the weight of the mixture of a flour selected from the group consisting of rice flour and cereal flour, immediately thereafter rapidly cooling the mixture to a temperature sufficient to form a solidified material, shaping and forming the solidified material, into the desired shape drying said shaped and formed material and then baking the dried material under conditions sufficient to form the puffed snack food product.

2. The process of claim 1, in which the mixture is rapidly cooled to at least about 5° C.

* * * * *